United States Patent Office 3,637,883
Patented Jan. 25, 1972

3,637,883
ALKYLATION OF AROMATIC COMPOUNDS
Louis Schmerling, Riverside, Ill., assignor to Universal
Oil Products Company, Des Plaines, Ill.
No Drawing. Filed Apr. 20, 1970, Ser. No. 30,353
Int. Cl. C07c 3/56
U.S. Cl. 260—671                                              12 Claims

ABSTRACT OF THE DISCLOSURE

Aromatic compounds, and particularly aromatic hydrocarbons, may be alkylated with olefinic hydrocarbons at relatively low operating temperatures by utilizing a catalyst comprising a mixture of zinc chloride and a higher valence halide of a metal which possesses at least two valences.

---

This invention relates to a process for the alkylation of aromatic compounds. More particularly, the invention is concerned with a process for alkylating aromatic compounds with alkylating agents, and particularly olefinic hydrocarbons, in the presence of certain catalytic compositions of matter comprising a mixture of two separate metal halides.

Heretofore, the alkylation of aromatic compounds, and particularly aromatic hydrocarbons, with an olefinic compound has been effected in the presence of zinc chloride alkylation catalysts at relatively high operating temperatures, said temperature usually being of the magnitude of 300° C. or more. These high temperatures have been required in order to obtain a practical commercial yield of the desired alkylation product. Therefore, in order to operate an alkylation process in an economically attractive manner, it was necessary to utilize relatively expensive reaction equipment whereby said high reaction temperatures could be maintained without seriously damaging said equipment. In contradistinction to the prior art method of alkylation of aromatic hydrocarbons, it has now been discovered that these aromatic compounds may be alkylated with olefinic compounds at much lower reaction temperatures utilizing catalytic compositions of matter which consists of two separate and distinct metal halides, the composition of the matter being hereinafter set forth in greater detail. In addition, it has also been established that the catalytic composition of matter of the present invention will permit the alkylation of aromatic compounds with alcohols at these lower reaction temperatures. As an example of this, it was found that zinc chloride alone does not catalyze any reaction between benzene and n-propyl alcohol at a temperature of 200° C. However, in the presence of cupric chloride which was added as a mixture with zinc chloride, or to a solution of zinc chloride in benzene and isopropyl alcohol which had been heated to 200° C. without reaction, an alkylation reaction occurred at 200° C. yielding isopropylbenzene (cumene) in a 53 mole percent yield as well as a smaller mole yield of diisopropylbenzenes, said yield being based on the alcohol charged.

The products of the alkylation of aromatic compounds with olefinic compounds will find a wide variety of uses in the chemical field. For example, ethylbenzene which is prepared by the alkylation of benzene with ethylene is used in organic synthesis, as a solvent and diluent, or as an intermediate in the production of styrene, said styrene being useful in preparing synthetic rubbers, plastics, resins, etc. Likewise, cumene (isopropylbenzene) which may be prepared by the alkylation of benzene with propylene is used as an additive to aviation gasoline, as a solvent, or an intermediate in the production of phenol acetone and alpha methylstyrene, the uses for these three latter compounds being well known in the art. In addition, relatively long chain alkylated aromatic compounds such as nonylbenzene, dodecylbenzene, and tetradecylbenzene which are prepared by the alkylation with benzene with 1-nonylene, 1-dodecylene, and 1-tetradecylene respectively are useful in the preparation of surface active agents useful as detergents, the straight-chain alkylbenzenes being especially effective for use as biodegradable detergents. The latter compounds are especially desired in present day life, in view of the increased amount of foams and suds which are appearing on the surface of streams, rivers, ponds, etc., which may be the water source for many cities, towns, and villages, etc. By using biodegradable detergents, the amount of foams will be decreased to a marked extent inasmuch as the bacteria will be able to consume the molecules and thus prevent a build-up of said unwanted foams and suds.

It is therefore an object of this invention to provide an improved process for the alkylation of aromatic compounds.

A further object of this invention is to provide a process for the alkylation of aromatic compounds utilizing olefinic compounds as the alkylation agents in the presence of certain catalytic compositions of matter whereby said alkylation may be effected at a relative low temperature.

In one aspect an embodiment of this invention resides in a process for the alkylation of an aromatic compound which comprises treating said compound with an alkylating agent at alkylation conditions in the presence of a catalyst consisting of zinc chloride and a higher valence halide of a metal which possesses at least two valences, and recovering the resultant alkylated aromatic compound.

A specific embodiment of this invention is found in the process of the alkylation of aromatic compounds which comprises treating benzene with ethylene in the presence of a catalyst consisting of a zinc chloride-cupric chloride mixture at a temperature in the range from about 0° to about 250° C. and a pressure in the range of from atmospheric to about 100 atmospheres, and recovering the resultant ethylbenzene.

Other objects and embodiments will be found in the following further detailed description of the present invention.

As hereinbefore set forth the present invention is concerned with a process for the alkylation of aromatic compounds, which by virtue of using a certain catalytic composition of matter, may be effected at relatively low operating conditions, especially a low operating temperature. Examples of alkylable aromatic compounds, and especially aromatic hydrocarbons, will include benzene, toluene, o-xylene, m-xylene, p-xylene, o-ethyltoluene, m-ethyltoluene, p-ethyltoluene, 1,2,3-trimethylbenzene, 1,2,4-trimethylbenzene, 1,3,5-trimethylbenzene, the isomeric diethylbenzenes, triethylbenzenes, dipropylbenzenes, etc., naphthalene, phenanthrene, anthracene, pyrene, their alkylated homologs, biphenyl, bibenzyl, etc. In addition, it is also contemplated that other aromatic compounds such as chlorobenzene, bromobenzene, dichlorobenzenes, dibromobenzenes, phenol, catechol, resorcinol, hydroquinone, benzoic acid, phthalic acid, isophthalic acid, terephthalic acid, etc., may also be alkylated according to the present process, although not necessarily with equivalent results. It is to be understood that the aforementioned aromatic hydrocarbons are only representative of the class of compounds which may be alkylated according to the present process, and that the process is not necessarily limited thereto.

Alkylating agents which may be used include alcohols and olefins. Examples of alcohols which may be used include primary alcohols such as methanol, ethanol, dodecanol, etc.; secondary alcohols such as isopropyl alcohol, 2-butanol, 2-pentanol, 3-pentanol, etc.; and tertiary alcohols such as t-butyl, t-pentyl alcohol, etc. It is also contemplated that cyclic alcohols may be suitable alkylating agents for the process of this invention. Examples of suitable olefinic compounds, and particularly olefinic hydrocarbons which may be used to alkylate the aforesaid aromatic compounds, comprise alkenes containing from 2 to about 20 carbon atoms as well as cycloalkenes containing from 3 to about 8 carbon atoms, specific examples of these olefins including ethylene, propylene, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, the isomeric nonenes, decenes, undecenes, dodocenes, tridecenes, tetradecenes, pentadecenes, hexadecenes, heptadecenes, octadecenes, nonadecenes, eicosenes; cyclopropene, cyclobutene, cyclopentene, cyclohexene, cycloheptene, cyclooctene, etc.

The catalytic composition of matter which is utilized to effect the process of this invention will comprise a mixture of zinc chloride and a higher valence halide of a metal which possesses at least two valences and, in addition, has the further criteria of being a weak or totally inactive Friedel-Crafts catalyst when used by itself. Suitable metals which form at least 2 metal halides differing in valence include copper, mercury, tin, cobalt, molybdenum, manganese, titanium, and chromium. The various bromides and chlorides of the above metals including cupric chloride, cupric bromide, mercuric chloride, mercuric bromide, stannic chloride, stannic bromide, cobaltic chloride, cobaltic bromide, molybdenum trichloride, molybdenum tetrachloride, molybdenum pentabromide, molybdenum tetrabromide, manganese trichloride, magnanese tribromide, titanium tetrachloride, titanium tetrabromide, chromic chloride, chromic bromide, etc., are thus utilizable within the scope of this invention. The preferred higher valence halide of a metal which possesses at least two valences is cupric chloride, although other inactive metal halide compounds of the type hereinbefore set forth may also be used. The two components of the catalyst are usually present in such an amount so that the molecular amount of the active Friedel-Crafts metal halide is less than the amount of the higher valence halide of the metal which possesses at least two valences.

The reaction conditions at which the process of this invention is effected will include temperatures ranging from about 0° up to about 250° C. and at pressures ranging from about atmospheric up to about 100 atmospheres or more. It is thus seen that the alkylation process of the present invention may be effected at a considerably lower temperature than that which is hereinbefore utilized in the prior art processes, the prior art alkylations requiring temperatures of 300° C. or higher. It is also contemplated within the scope of this invention that the alkylation reaction may, if so desired, be effected in the presence of an added amount of hydrogen chloride and air whereby the cupric chloride, after being reduced to cuprous chloride, may be regenerated back to cupric chloride for further use as a catalyst. Such use of oxygen (air) is particularly desirable when an increased yield of a by-product, the self condensation product of the alkylbenzene (e.g., 1,1-diphenylethane from ethylene and benzene), is desired.

The process of this invention may be effected in any suitable manner and may comprise a batch or continuous type operation. In the batch type process, when the reaction is effected utilizing temperatures above the boiling point of the aromatic hydrocarbon, the catalyst and the aromatic compound are placed in an appropriate reaction apparatus such as a rotating autoclave. In addition, the autoclave may also contain hydrogen chloride. The autoclave is sealed and brought to the desired operating pressures by introducing the olefinic alkylating agent, along with an oxygen-containing gas such as air. Alternatively, if the olefinic alkylating agent is in liquid form, it is introduced with the aromatic hydrocarbon and the catalyst; the desired operating pressure is then effected by introducing an inert gas such as nitrogen, an oxygen-containing gas such as air, or a mixture thereof into said reaction vessel, the prime purpose of the nitrogen being to maintain a portion of the reactants in the liquid phase. Following this, the autoclave is heated to the desired operating temperature and maintained thereat for a predetermined period of time, at the end of the time heating is discontinued, the autoclave is allowed to return to room temperature, and the excess pressure is discharged. The reaction mixture is recovered, separated from the catalyst, and subjected to conventional means of separation, purification, and recovery whereby the desired alkylated aromatic compound is isolated from any unreacted starting materials and/or undesired side reaction products which may have been formed.

It is also contemplated within the scope of this invention that the present process may be effected in a continuous manner of operation. One such method of effecting this type operation is to continuously charge the materials comprising the aromatic compound and the olefinic alkylating agent to a reaction vessel which is maintained at the proper operating conditions of pressure and temperature and which will contain the desired catalytic composite of matter. The aromatic compound and the olefinic alkylating agent may be charged to the reaction vessel through separate lines or, if so desired, they may be admixed prior to entry into said reactor and charged thereto in a single stream. In addition, the regeneration agents comprising hydrogen chloride and an oxygen-containing gas such as air may also be charged to the reactor through a separate line. After completion of the desired residence time has elapsed, the reactor effluent is continuously withdrawn, and the desired alkylated aromatic compound is separated from any unreacted starting materials and/or side reaction products, the alkylated aromatic compound being sent to storage while the unreacted starting materials are recycled to form a portion of the feed stock. Due to the physical nature of the catalytic composition of matter, it is possible to effect a continuous manner of operating by utilizing a fixed bed method in which the catalyst is disposed as a fixed bed in the reactor, and the reactants are passed through said reactor in either an upward or downward flow; by utilizing a moving bed type operation in which the catalyst bed and the reactants pass through the reactor either concurrently or countercurrently to each other; or a slurry type operation in which the catalyst is carried into the reactor as a slurry with one or both of the starting materials. The catalyst used in the fixed bed operations may consist of a substance such as alumina, silica, alumina-silica, pumice, zeolites, etc., on which the metal halides are supported, suitably via impregnation from an aqueous solution followed by calcination at a temperature in the range of 100–200° C.

Examples of alkylated aromatic compounds which may be prepared according to the process of this invention will include ethylbenzene, isopropylbenzene (cumene), sec-butylbenzene, isomeric amylbenzenes, hexylbenzenes, heptylbenzenes, etc., ethylnaphthalene, isopropylnaphthalene, sec-butylnaphthalene, amylnaphthalenes, o-ethyltoluene, m-ethyltoluene, p-ethyltoluene, o-isopropyltoluene, n-isopropyltoluene, p-isopropyltoluene, o-diethylbenzene, m-diethylbenzene, p-diethylbenzene, etc. It is to be understood that the aforementioned alkylated aromatic compounds are only representative of the type of compounds which may be prepared according to the process described herein and that the present invention is not necessarily limited thereto.

The following examples are given to illustrate the process of the present invention which, however, are not intended to limit the generally broad scope of the present invention in strict accordance therewith.

EXAMPLE I

In this example 76 g. (0.83 mole) of toluene was placed in the glass liner of a rotating autoclave which also contained 61 g. of a catalyst composite, said catalyst composite consisting of a mixture of 52 g. (0.39 mole) of cupric chloride and 9 g. (0.07 mole) of zinc chloride. The autoclave was sealed and ethylene pressed in until an initial pressure of 40 atmospheres was reached, said charge amounting to about 1.25 moles of ethylene. The autoclave was then heated to a temperature of 200° C. and maintained thereat for a period of four hours, the maximum pressure during this time rising to 60 atmospheres. At the end of the aforementioned four hour period, heating was discontinued and the autoclave allowed to return to room temperature, the final pressure at room temperature being 20 atmospheres. The excess pressure was discharged and the reaction product comprising 75 g. of a clear amber liquid was recovered. Analysis of this product by means of gas liquid chromatography and mass spectrometry disclosed the presence of ethylated toluene in about 30% yield.

EXAMPLE II

In this example 116 g. (1.49 mole) of benzene was placed in a glass liner of a rotating autoclave along with 87 g. of a catalyst composition of matter consisting of 76 g. (0.56 mole) of cupric chloride and 11 g. (0.08 mole) of zinc chloride. The liner was sealed into the autoclave and ethylene pressed in until an initial pressure of 40 atmospheres was reached. The autoclave was then heated to a temperature of 194° C. and maintained in a range of from 194° to 207° C. for a period of four hours, the maximum pressure at this temperature being 56 atmospheres. Following this, heating was discontinued and the autoclave allowed to return to room temperature, the final pressure at room temperature being 10 atmospheres. The excess pressure was discharged, the autoclave was opened and the reaction product comprising 126 g. of a clear amber liquid was recovered. Analysis of this product by a manner similar to that set forth in Example I above disclosed the presence of a 36% yield of ethylbenzene, a 12% yield of diethylbenzenes and a 2% yield of triethylbenzenes, together with a small amount (3% based on the conversion of 2 moles of $CuCl_2$ per mole of product) of 1,1-diphenylethane.

It is to be noted that the ethylbenzenes are obtained in about a 50 mole percent based on the benzene charged, by the reaction of benzene with ethylene in the presence of a 7:1 mole ratio of cupric chloride to zinc chloride. However, when the mole ratio of cupric chloride was reduced to a 2:1 mole ratio, the yield of ethylbenzenes was reduced to about a 25% mole yield, that is, about half, and, a further decrease in the ratio of cupric chloride to zinc chloride to about a 1:1 mole ratio results in again decreasing the yield of ethylbenzenes to about 13%.

EXAMPLE III

To illustrate the necessity of the presence of cupric chloride in the catalyst composite, two experiments were performed using conditions identical to those set forth in Examples I and II above, the only difference being that the catalyst consisted only of zinc chloride, no cupric chloride being present. In one experiment, 78 g. (0.85 mole) of toluene was treated with 40 atmospheres of ethylene in the presence of 8 g. zinc chloride at a temperature of about 200° C. for a period of about four hours. At the end of the four hour period, the reaction product was recovered and found to contain less than 3% ethyltoluene. Likewise, when 122 g. (1.57 mole) of benzene was treated with 40 atmospheres of ethylene in the presence of a catalyst consisting of only 11 g. of zinc chloride at a temperature of 210° C. for a period of four hours analysis of the reaction product disclosed that little or no reaction had occurred.

Therefore, it is readily apparent that a catalyst composite which includes the presence of a higher valence halide of a metal which possesses at least two valences will permit the alkylation of an aromatic compound with an olefinic alkylating agent at a relatively low temperature of about 200° C., whereas a catalyst which does not contain such a component is ineffective at this temperature, little or no alkylation occurring during the reaction.

EXAMPLE IV

In this example, 128 g. (1.0 mole) of naphthalene is placed in a glass liner of a rotating autoclave. In addition, a catalyst composition consisting of 52 g. (0.39 mole) of cupric chloride and 4.5 g. (0.03 mole) of zinc chloride is also placed in the liner. The liner is sealed into the autoclave and hydrogen chloride is added thereto. The autoclave is pressured to 50 atmospheres by the addition of 40 atmospheres of ethylene and 10 atmospheres of air. The autoclave is maintained at a temperature of about 200° C. for a period of four hours, at the end of which time the autoclave is allowed to return to room temperature and the excess pressure is discharged. The reaction mixture is recovered, separated from the catalyst, and analyzed in the manner of that similar in the examples above. This analysis will disclose the presence of ethylnaphthalenes.

EXAMPLE V

To a glass liner of a rotating autoclave is charged 78 g. (1.0 mole) of benzene, said autoclave containing a catalyst composite consisting of a mixture of zinc chloride and cupric chloride. The liner is sealed into the autoclave and propylene pressured in until an initial pressure of 40 atmospheres is reached. The autoclave is then heated to a temperature of about 200° C. and maintained thereat for a period of four hours during which time the maximum pressure at this temperature will reach about 60 atmospheres. At the end of the four hour period heating is discontinued, the autoclave is allowed to return to room temperature, and the excess pressure, which will drop to less than 40 atmospheres, is discharged. The autoclave is opened and the reaction product is separated from the catalyst. Analysis of this product will disclose the presence of isopropylbenzene (cumene).

EXAMPLE VI

In a manner similar to that set forth in the above examples, 92 g. (1.0 mole) of toluene is treated with propylene in the presence of a catalyst composite consisting of a mixture of zinc chloride and cupric chloride, said reaction conditions including a temperature of about 150° C., a pressure of 40 atmospheres, and a time period of four hours. After recovery of the reaction mixture and separation from the catalyst, analysis will disclose the presence of isomeric propyltoluenes.

EXAMPLE VII

Heating 100 g. benzene with ethylene at 200° C. in a manner similar to that described in Example II, but in the presence of a catalyst comprising 15 g. (0.11 mole) of zinc chloride and 20 g. (0.07 mole) of mercuric chloride yields ethylbenzene as the major product together with a trace amount of 1,1-diphenylethane.

EXAMPLE VIII

In this example benzene and 2-butanol are heated to a temperature of 200° C. in the presence of a catalyst composite consisting of a mixture of cupric chloride and zinc chloride. After recovery of the reaction mixture, analysis of the mixture will disclose the presence of sec-butylbenzene as a major product.

I claim as my invention:

1. A process for the alkylation of an aromatic compound which comprises treating said compound with an alkylating agent at alkylation conditions in the presence of a catalyst consisting of zinc chloride and a higher valence halide of a metal which possesses at least two valences, and recovering the resultant alkylated aromatic compound.

2. The process as set forth in claim 1 in which said alkylation conditions include a temperature in the range of from about 0° to about 250° C. and pressure in the range of from about atmospheric to about 100 atmospheres.

3. The process as set forth in claim 1 in which said alkylating agent is an alcohol.

4. The process as set forth in claim 1 in which said alkylating agent is an olefinic hydrocarbon.

5. The process as set forth in claim 1 in which said catalyst is a zinc chloride-cupric chloride mixture.

6. The process as set forth in claim 1 in which said catalyst is zinc chloride-mercuric chloride mixture.

7. The process as set forth in claim 1 in which said aromatic compound is benzene, said olefinic hydrocarbon is ethylene, and said alkylated aromatic compound is ethylbenzene.

8. The process as set forth in claim 1 in which said aromatic compound is toluene, said olefinic hydrocarbon is ethylene, and said alkylated aromatic compound is an ethyltoluene.

9. The process as set forth in claim 1 in which said aromatic compound is naphthalene, said olefinic hydrocarbon is ethylene, and said alkylated aromatic compound is ethylnaphthalene.

10. The process as set forth in claim 1 in which said aromatic compound is benzene, said olefinic hydrocarbon is propylene, and said alkylated aromatic compound is isopropylbenzene.

11. The process as set forth in claim 1 in which said aromatic compound is toluene, said olefinic hydrocarbon is propylene, and said alkylated aromatic compound is a propyltoluene.

12. The process as set forth in claim 1 in which said process is effected in the presence of an oxygen-containing gas.

References Cited

UNITED STATES PATENTS

| | | | |
|---|---|---|---|
| 2,426,665 | 9/1947 | Bloch | 260—671 C |
| 2,849,505 | 8/1958 | Schmerling | 260—671 |
| 3,031,514 | 4/1962 | Kosmir | 260—671 C |
| 3,402,909 | 1/1969 | Schmerling | 260—671 |

CURTIS R. DAVIS, Primary Examiner